(12) United States Patent
Yoneyama et al.

(10) Patent No.: US 6,616,280 B2
(45) Date of Patent: Sep. 9, 2003

(54) PROJECTION TYPE IMAGE DISPLAY APPARATUS USING REFLECTION TYPE LIQUID CRYSTAL DISPLAY DEVICE

(75) Inventors: Kazuya Yoneyama, Saitama (JP); Yasuyuki Miyata, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/097,591

(22) Filed: Mar. 15, 2002

(65) Prior Publication Data

US 2002/0140913 A1 Oct. 3, 2002

(30) Foreign Application Priority Data

Mar. 28, 2001 (JP) ........................................ 2001-092340

(51) Int. Cl.[7] ............................................... G03B 21/14
(52) U.S. Cl. ......................................... 353/20; 353/122
(58) Field of Search ............................ 353/20, 98, 38, 353/31, 33, 34, 37; 349/5, 7, 8, 9

(56) References Cited

U.S. PATENT DOCUMENTS

| | | | | |
|---|---|---|---|---|
| 5,467,146 A | * | 11/1995 | Huang et al. | ............... 348/743 |
| 5,902,031 A | * | 5/1999 | Urabe | ........................ 353/31 |
| 5,905,545 A | * | 5/1999 | Poradish et al. | ............ 348/743 |
| 5,984,478 A | * | 11/1999 | Doany et al. | ................. 353/84 |
| 6,005,722 A | * | 12/1999 | Butterworth et al. | ....... 359/712 |
| 6,252,636 B1 | * | 6/2001 | Bartlett | ...................... 348/743 |
| 6,343,862 B1 | * | 2/2002 | Sawai et al. | ................... 353/1 |
| 6,406,149 B2 | * | 6/2002 | Okuyama | .................... 353/38 |
| 6,457,828 B1 | * | 10/2002 | Hayashi | ...................... 353/20 |

* cited by examiner

Primary Examiner—William Dowling
(74) Attorney, Agent, or Firm—Snider & Associates; Ronald R. Sinder

(57) ABSTRACT

A projection type image display apparatus makes illumination light from a light source section incident on a rectangular reflection type liquid crystal display device by way of a polarization beam splitter, optically modulates the illumination light in the reflection type liquid crystal display device, and projects thus modulated light through a projection lens by way of the polarization beam splitter. A plane including the optical axis of illumination light incident on the polarization beam splitter and the optical axis of illumination light emitted from the polarization beam splitter toward the projection lens is substantially parallel to a direction in which a shorter side of the reflection type liquid crystal display device extends.

14 Claims, 5 Drawing Sheets

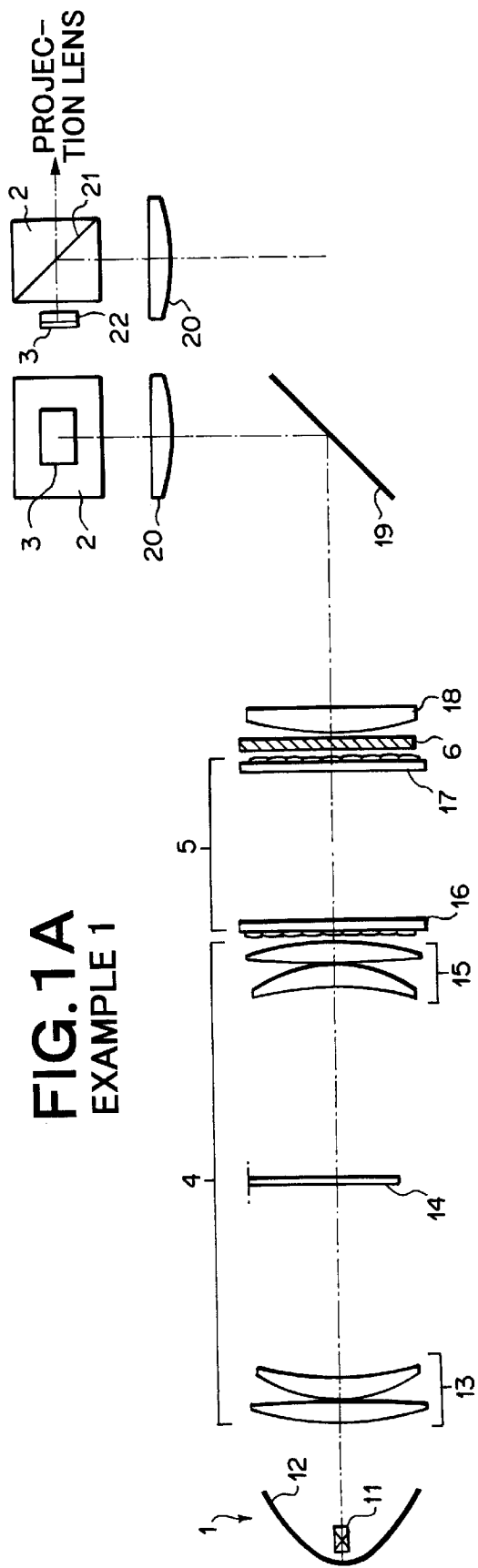

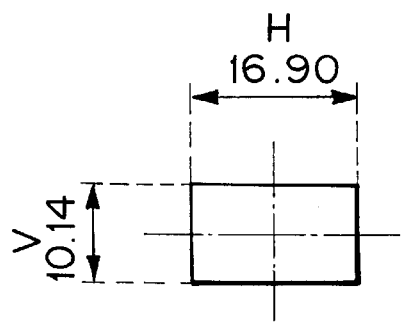
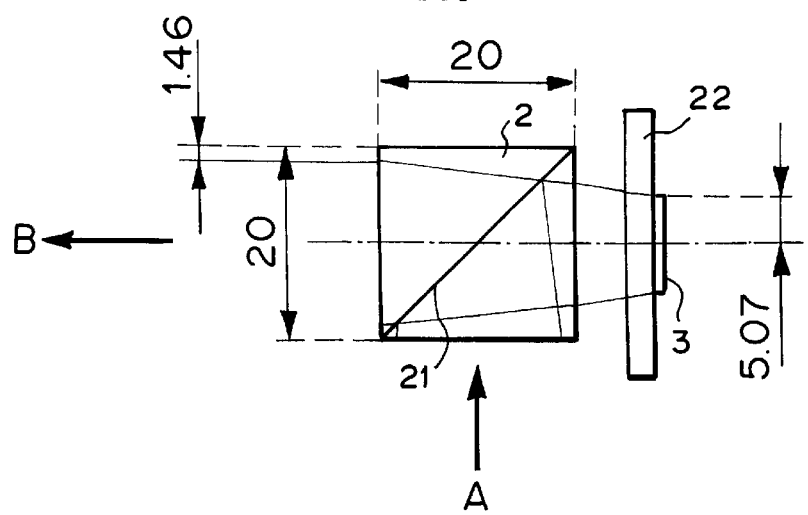
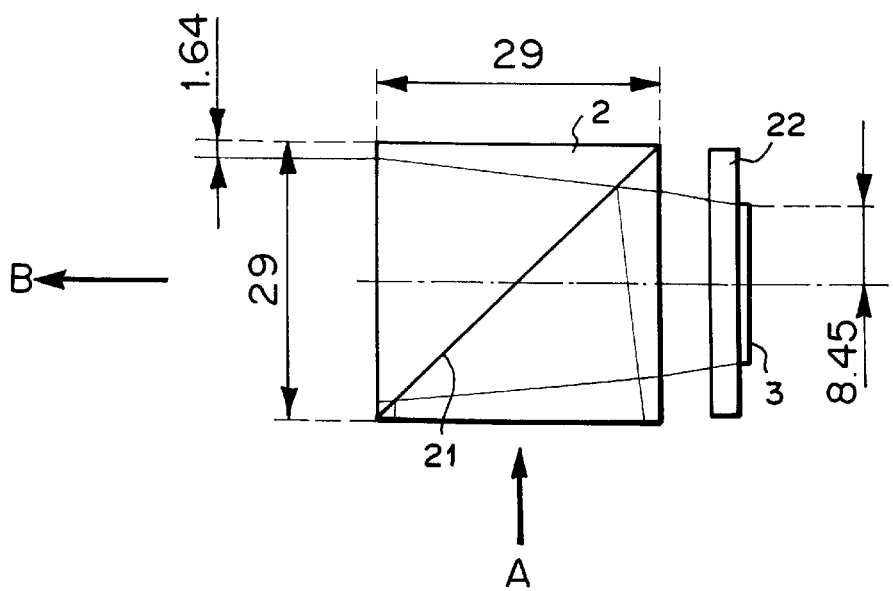

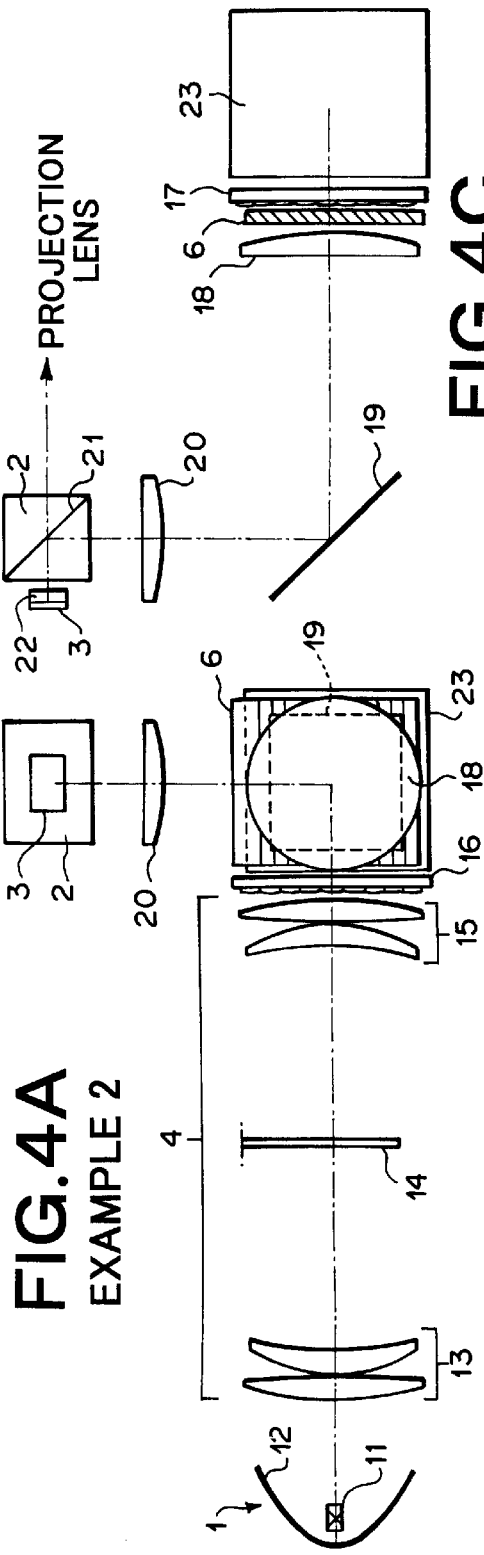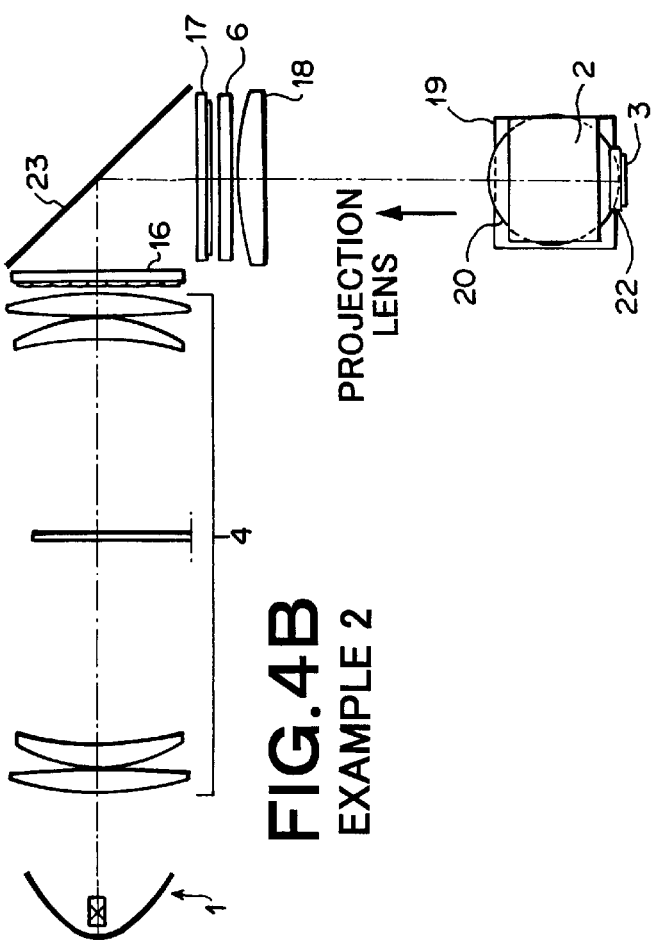
FIG.4A EXAMPLE 2
FIG.4B EXAMPLE 2
FIG.4C EXAMPLE 2

EXAMPLE 3

PROJECTION TYPE IMAGE DISPLAY APPARATUS USING REFLECTION TYPE LIQUID CRYSTAL DISPLAY DEVICE

RELATED APPLICATIONS

This application claims the priority of Japanese Patent Application No. 2001-092340 filed on Mar. 28, 2001, which is incorporated herein by reference.

BACKGROUND OF THE INVENTION

1. Field of the Invention

The present invention relates to a projection type image display apparatus for projecting onto a screen under magnification an image displayed in a reflection type liquid crystal display device; and, more specifically, to a projection type image display apparatus using a reflection type liquid crystal display device, which makes illumination light incident on a rectangular reflection type liquid crystal display device by way of a polarization beam splitter.

2. Description of the Prior Art

In recent years, as liquid crystal display devices of projection type image display apparatus, those of reflection type have come into use, since they can attain a higher aperture ratio than those of transmission type, thereby being able to satisfy demands for higher resolution and higher illumination. The reflection type liquid crystal display devices are characterized in that they utilize an optical rotation effect of a liquid crystal, so as to distinguish ON and OFF states of a pixel from each other according to the direction of optical rotation.

Recently, on the other hand, ferroelectric liquid crystal display devices (hereinafter referred to as "FLC devices"), which are a kind of reflection type liquid crystal display devices, have become known. The FLC devices not only have the above-mentioned characteristic features of common reflection type liquid crystal display devices, but also are most characterized in their fast response to voltage applications. When an FLC device exhibiting such a fast response speed is used, a single color wheel can carry out color decomposition in a time series, whereas a conventional transmission type liquid crystal or reflection type liquid crystal uses three devices corresponding to respective primary colors of light in order to display a color image. Namely, the use of FLC devices is advantageous in terms of cost and weight of apparatus, whereby they are expected to be in wider use in projection type image display apparatus from now on.

In general, when a reflection type liquid crystal display distinguishing ON and OFF states of a pixel from each other according to the direction of optical rotation is used for constructing an projection optical system, a polarization beam splitter (hereinafter referred to as "PBS") is often disposed upstream the reflection type liquid crystal display device, immediately in front of the device in particular.

Using a reflection type liquid crystal display device and a PBS in combination as mentioned above is often problematic in that its finally projected images fail to yield a favorable contrast. When a screen is displayed totally black on the liquid crystal display device, all the luminous fluxes are ideally blocked by the PBS. In practice, however, the state of polarization of luminous fluxes reflected by the liquid crystal display may change under the influence of distortion and the like existing within the PBS, whereby the light to be totally blocked may leak toward the screen. Thus, even when the screen is displayed black on the liquid crystal display device, light may reach the screen to a certain extent and enhance the luminance on the screen, thereby lowering the contrast of projected images.

The contrast of an image is generated within the PBS in a process during which a luminous flux reflected by the liquid crystal display is emitted toward the screen by way of the PBS. Therefore, the apparatus is desired to have a configuration yielding a shorter optical path within the PBS.

In such an apparatus, the PBS is arranged between the reflection type liquid crystal display device and the final surface of the projection lens, whereby the projection lens is required to have a certain extent of back focus. Securing a long back focus not only makes it difficult to correct distortion and chromatic aberration in magnification, but also is problematic in that the projection lens itself increases its size. When the apparatus is constructed with a PBS having smaller dimensions such that the luminous flux emitted toward the screen by way of the PBS has a shorter optical path within the PBS, the back focus required for the projection lens also becomes shorter, which is desirable for overcoming the above-mentioned problem as well.

SUMMARY OF THE INVENTION

In view of such circumstances, it is an object of the present invention to provide a projection type image display apparatus using a reflection type liquid crystal display device which can improve the contrast of a projected image and reduce the size of a projection lens by yielding a configuration which can reduce dimensions of a PBS such that the luminous flux reflected by the reflection type liquid crystal display device shortens its optical path within the PBS in the process of being emitted toward the screen by way of the PBS.

The present invention provides a projection type image display apparatus which makes illumination light from a light source section incident on a rectangular reflection type liquid crystal display device by way of a polarization beam splitter, optically modulates the illumination light in the reflection type liquid crystal display device, and projects thus modulated light through a projection lens by way of the polarization beam splitter;

wherein a plane including an optical axis of the illumination light incident on the polarization beam splitter and an optical axis of the illumination light emitted from the polarization beam splitter toward the projection lens is substantially parallel to a direction in which a shorter side of the reflection type liquid crystal display device extends.

The illumination light incident on the polarization beam splitter may be bent by about 90 degrees by a polarization separating film within the polarization beam splitter so as to be reflected toward the reflection type liquid crystal display device, reflected by the reflection type liquid crystal display device, and then transmitted through the polarization separating film of the polarization beam splitter so as to be emitted toward the projection lens. Alternatively, the illumination light incident on the polarization beam splitter may be transmitted through a polarization separating film within the polarization beam splitter so as to be emitted toward the reflection type liquid crystal display device, reflected by the reflection type liquid crystal display device, and then bent by about 90 degrees by the polarization separating film of the polarization beam splitter so as to be reflected toward the projection lens.

Preferably, the apparatus further comprises color decomposing means for decomposing the illumination light from the light source section into a plurality of color light components.

Preferably, the light source section outputs nonpolarized illumination light, whereas the illumination light is made incident on the polarization beam splitter by way of an integrator section for homogenizing an intensity distribution of the illumination light within a cross section perpendicular to an optical axis thereof and polarization converting means for converting the illumination light into linearly polarized light vibrating in one direction.

The integrator section may comprise a rod integrator.

The integrator section may comprise a flyeye integrator composed of at least two flyeyes, each constituted by a plurality of lenses arranged two-dimensionally, disposed on an optical axis, whereas a polarization converting device may be disposed as the polarization converting means downstream the integrator section, the polarization converting device comprising a beam splitter for splitting the incident nonpolarized illumination light into first and second polarized light beams having respective polarized light components orthogonal to each other, a mirror for reflecting one of the polarized light beams separated by the beam splitter, and a phase plate for turning one of the polarized light beams into a light beam having the same direction of polarization as that of the other polarized light beam, so that the nonpolarized illumination light is emitted after being converted into light having only one of the polarized light components.

Preferably, the color decomposing means is a color wheel apparatus or color switching device.

The light source section may output substantially parallel illumination light, whereas the illumination light may be made incident on the integrator section by way of an afocal unit comprising front- and rear-group lenses constituting a substantially afocal system and a transmission type color wheel disposed as the color decomposing means near a focal point of the afocal system.

The front- and rear-group lenses of the afocal unit may be constituted by components identical to each other.

The front-group lens of the afocal unit or the afocal unit as a whole may be made detachable.

Preferably, the reflection type liquid crystal display device is a ferroelectric liquid crystal display device.

Preferably, the illumination light is made incident on the polarization separating film of the polarization beam splitter as S-polarized light and then bent by about 90 degrees by the polarization separating film so as to be reflected toward the reflection type liquid crystal display device, or is made incident on the polarization separating film of the polarization beam splitter as P-polarized light and then transmitted through the polarization separating film so as to be emitted toward the reflection type liquid crystal display device.

At least one optical component disposed in an optical path from the light source section to the reflection type liquid crystal display device may have an aspheric form.

BRIEF DESCRIPTION OF THE DRAWINGS

FIGS. 1A to 1C are views showing the optical arrangement of a projection type image display apparatus using a reflection type liquid crystal display device in accordance with Example 1;

FIGS. 2A to 2C are views for explaining the positional relationship between a PBS and a reflection type liquid crystal display device in apparatus of the present invention;

FIGS. 4A to 4C are views showing the optical arrangement of a projection type image display apparatus using a reflection type liquid crystal display device in accordance with Example 2.

DESCRIPTION OF THE PREFERRED EMBODIMENTS

Figure 3A:
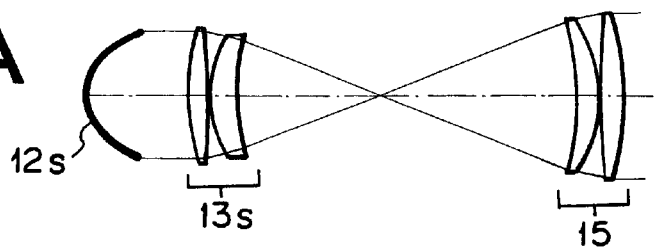
FIGS. 3A to 3C are views showing relationships between a reflector and an afocal unit in the apparatus of Example 1.

In the following, embodiments of the present invention will be explained with reference to the drawings. FIGS. 1A to 1C are views for showing the configuration of a projection type image display apparatus using a reflection type liquid crystal display device of Example 1, which will be explained later, as a typical example of a first embodiment of the present invention. FIG. 1A shows the optical arrangement of the apparatus of Example 1 as seen from the front face thereof. FIG. 1B shows the optical arrangement of the apparatus as seen from the top. FIG. 1C shows the optical arrangement of a part of the apparatus as seen from the right side of the paper surface of FIG. 1A.

This apparatus is a projection type image display apparatus using a reflection type liquid crystal display device, which makes illumination light from a light source section 1 incident on a rectangular reflection type liquid crystal display device 3 by way of a polarization beam splitter (hereinafter referred to as "PBS") 2, optically modulates the incident light in the reflection type liquid crystal display device 3, and projects thus modulated light through a projection lens (not depicted) by way of the PBS 2. Disposed between the light source section 1 and the PBS 2 are an afocal unit 4, an integrator section 5, a polarization converting device 6, condenser lenses 18, 20, and a bending mirror 19. In this apparatus, a plane including the optical axis of illumination light incident on the PBS 2 and the optical axis of illumination light emitted toward the projection lens from the PBS 2 is substantially parallel to the direction in which a shorter side of the reflection type liquid crystal display device extends.

The positional relationship between the PBS 2 and the reflection type liquid crystal display device 3 will be explained with reference to FIGS. 2A to 2C. FIG. 2A is a view showing the form of display surface of a typical reflection type liquid crystal display device. As shown in FIG. 2A, a typical reflection type liquid crystal display device has a rectangular display surface, whose horizontal length H is longer than vertical length V. This form usually has an aspect ratio corresponding to the finally formed image. In FIG. 2A, horizontal length H=16.90, and vertical length V=10.14, thus yielding an aspect ratio of 5:3.

FIG. 2B is a view showing the positional relationship between the PBS 2 and reflection type liquid crystal display device 3 in the apparatus of this embodiment. An FLC device is used as the reflection type liquid crystal display device 3, whereas an FLC cover glass sheet 22 is disposed between the PBS 2 and the FLC device 3. By way of the members mentioned above, the illumination light from the light source section 1 is made incident on the PBS 2 in the direction of A. This drawing is depicted such that a luminous flux is incident on and exits from the FLC device surface in a telecentric fashion at an F value of 2.8. This illumination light is bent by an angle of about 90 degrees by a polarization separating film 21 within the PBS 2 so as to be reflected toward the FLC 3, reflected by the FLC device 3, and then transmitted through the polarization separating film 21 of the PBS 2 so as to be emitted toward the projection lens. In the apparatus of this embodiment, the rectangular FLC device 3 is arranged such that a plane including the optical axis of illumination light incident on the PBS 2 and the optical axis of illumination light emitted toward the projection lens is substantially parallel to the direction in which a shorter side of the FLC device 3 extends. Namely, this plane is parallel to the paper surface, whereas the direction in which a shorter side of the FLC device 3 extends is substantially parallel to this plane, whereby the shorter side (vertical length V) of the FLC device 3 is seen in FIG. 2B.

FIG. 2C shows a comparative example for the apparatus of this embodiment. In this drawing, a plane including the optical axis of illumination light incident on the PBS 2 and the optical axis of illumination light emitted from the PBS 2 toward the projection lens is substantially parallel to a direction in which a longer side of the FLC device 3 extends. As in FIG. 2B, the illumination light from the light source section is incident on and exits from the FLC device surface in a telecentric fashion at an F value of 2.8. In FIG. 2C, the plane including the optical axis of illumination light incident on the PBS 2 and the optical axis of illumination light emitted from the PBS 2 toward the projection lens is a plane parallel to the paper surface, whereas the direction in which a longer side of the FLC device 3 extends is substantially parallel thereto, whereby the longer side (horizontal length H) of the FLC device 3 is seen in FIG. 2C.

In this plane, as can be seen from FIGS. 2B and 2C, each side of the PBS 2 in FIG. 2B is about 70% of that in FIG. 2C. Therefore, when the PBS 2 and the FLC device 3 are arranged in the positional relationship shown in FIG. 2B, the optical path of illumination light passing through the PBS 2 can be shortened in a process during which the illumination light optically modulated by the FLC device 3 so as to carry image information is directed toward the projection lens by way of the PBS 2.

As a consequence, changes in the state of polarization of luminous fluxes reflected by the liquid crystal display device 3 can be reduced, whereby the contrast of projected images can be improved. When the PBS 2 has smaller dimensions, the back focus required for the projection lens becomes shorter, thereby alleviating the burden on the projection lens, thus making it easier for the projection lens to reduce its size.

While there has recently been a tendency of employing a wide screen having an aspect ratio of 16:9 or the like, the positional relationship between the PBS 2 and reflection type liquid crystal display device 3 in accordance with the present invention is considered to become more advantageous as the screen is wider.

In the case where the illumination light incident on the PBS 2 from the light source section is bent by about 90 degrees by the polarization separating film 21 so as to be reflected toward the reflection type liquid crystal display device 3 as in this embodiment, it is preferred that, when necessary, the polarization of illumination light be converted beforehand so as to be made incident on the polarization separating film 21 of the PBS 2 as S-polarized light. This is because of the fact that a better reflection efficiency is obtained when the illumination light is made incident on the polarization separating film 21 as S-polarized light, thereby preventing light quantity loss from occurring.

A second embodiment of the present invention is one in which, in an apparatus having a configuration substantially the same as that of the above-mentioned apparatus, the positional relationship between the PBS 2 and the reflection type liquid crystal display device 3 is changed as follows. Namely, in this embodiment, the illumination light incident on the PBS 2 is transmitted through the polarization separating film 21 within the PBS 2 so as to be directed toward the reflection type liquid crystal display device 3, reflected by the reflection type liquid crystal display device 3, and then bent by about 90 degrees by the polarization separating film 21 of the PBS 2 so as to be reflected toward the projection lens. This configuration can be considered one in which, in the above-mentioned FIG. 2B, the illumination light is made incident on the PBS 2 in the direction opposite from that of B in the first embodiment, transmitted through the polarization separating film 21 of the PBS 2 so as to be directed to the FLC device 3, reflected by the FLC device 3, and then bent by about 90 degrees by the polarization separating film 21 of the PBS 2 so as to be emitted in the direction opposite from that of A.

As with the first embodiment, the second embodiment can shorten the optical path by which the illumination light passes through the PBS 2, thus yielding operations and effects similar to those of the first embodiment.

In the case where the illumination light incident on the PBS 2 from the light source section side is transmitted through the polarization separating film 21 so as to be emitted toward the reflection type liquid crystal display device 3 as in this embodiment, it is preferred that, when necessary, the polarization of illumination light be converted beforehand so as to be made incident on the polarization separating film 21 of the PBS 2 as P-polarized light. In such a configuration, a luminous flux to be projected, which is modulated by the downstream reflection type liquid crystal display device 3, is bent by about 90 degrees by the polarization separating film 21 so as to be reflected toward the projection lens. Therefore, a better reflection efficiency will be obtained if the P-polarized light is made incident on the PBS 2 from the light source section side so as to be transmitted therethrough, and the luminous flux optically modulated into S-polarized light by the reflection type liquid crystal display device 3 is made incident on the polarization separating film 21.

The above-mentioned embodiments may include any positional relationship between the PBS 2 and the reflection type liquid crystal display device 3, even if parallel relationships in the above-mentioned embodiments are altered by a mirror and the like disposed in the optical path, as long as positional relationships similar to those of the above-mentioned embodiment can be obtained when such a mirror and the like are removed therefrom.

EXAMPLES

In the following, examples of the present invention will be explained. Among the examples, members similar to each other will be referred to with numerals or letters identical to each other.

Example 1

As mentioned above, FIGS. 1A to 1C are views showing the configuration of a projection type image display apparatus using a reflection type liquid crystal display device in accordance with Example 1. The configuration of this apparatus will be explained in further detail.

A luminous flux from a luminous body 11 is forwardly emitted as substantially parallel light from the aperture of a parabolic reflector 12, and advances from left to right in the drawing, thereby entering an afocal unit 4. In the afocal unit 4, a front-group lens 13 and a rear-group lens 15 constitute a substantially afocal system, whereas a transmission type color wheel 14 is disposed as a color decomposing means near the focal position of the front-group lens 13, i.e., at a middle position of the afocal unit 4, where the luminous flux attains the smallest diameter. Here, the illumination light emitted from the afocal unit 4 has a luminous flux diameter substantially on a par with that at the time when emitted from the aperture of the reflector 12.

The afocal unit 4 is disposed between the light source section 1 emitting parallel light and a flyeye integrator 5, on the downstream thereof, on which the parallel light is desired to be made incident. The afocal unit 4 acts to reduce the luminous flux diameter of illumination light so as to make it suitable for the color wheel 14, and emit the parallel light toward the flyeye integrator 5. If the afocal unit 4 is eliminated, so that the flyeye integrator 5 is disposed immediately downstream the reflector 12, the optical system will be hard to conform to the aperture form of the reflector 12 when it is changed as will be explained later. Since the afocal unit 4 is inserted, however, the optical system can conform to various aperture forms of the reflector 12.

The front-group lens 13 and rear-group lens 15 of the afocal unit 4 are constituted by components identical to each other. In FIGS. 1A to 1C, the lens on the light source section side in the front-group lens 13 and the lens on the PBS side of the rear-group lens 15 are components identical to each other, whereas the lens on the PBS side of the front-group lens 13 and the lens on the light source section side of the rear-group lens 15 are components identical to each other. Such a configuration improves the productivity.

The transmission type color wheel 14 is a color decomposing means for decomposing illumination light into a plurality of color light components in this projection type color image display apparatus. In general, a color wheel apparatus such as the color wheel 14 is a disk made of glass, which is substantially equally divided into three areas sectored about its center, each area is formed with a dichroic film for reflecting or transmitting luminous fluxes of corresponding one of three primary light components alone. While the disk is rotated with a motor shaft secured to the center part thereof, illumination light is made incident on a marginal part thereof at a predetermined position, whereby the illumination light can be decomposed into individual color light components in a time series. Since the transmission type color wheel 14 is used in this example, luminous fluxes of three primary colors are successively emitted one by one in a time series by passing through the color wheel 14. While images formed by thus divided individual color light components are projected onto a screen in a time series, they can be recognized as a color image if their changing speed is sufficiently faster than the human visible speed.

The color wheel apparatus is a color decomposing means which is lighter in weight, smaller in size, and less expensive as compared with the conventional three-plate color decomposing optical system. When this apparatus is used, however, the liquid crystal display device on the downstream must have a high response speed in order for the images on the screen to be recognized as a color image. This example uses the FLC device 3 as the reflection type liquid crystal display device 3 as will be explained later.

After being emitted from the afocal unit 4, the illumination light is made incident on the integrator section 5. The integrator section 5 homogenizes the intensity distribution of illumination light within a cross section perpendicular to the optical axis, and is constituted by a flyeye integrator 5 composed of two flyeyes 16, 17, each composed of a plurality of lenses arranged two-dimensionally, disposed on the optical axis. Namely, the illumination light incident on the flyeye 16 on the light source section side as substantially parallel light is divided into partial luminous fluxes by respective cells of the flyeye 16. The flyeye 17 on the FLC device side is disposed near a position where a plurality of secondary light source images corresponding to the number of divisions of the flyeye 16 on the light source section side are generated, and emits each of the partial luminous fluxes toward an area to be illuminated.

Disposed on the downstream of the integrator section 5 so as to act as a polarization converting means for converting the illumination light into linearly polarized light vibrating in a single direction is a polarization converting device 6 comprising a beam splitter for dividing incident nonpolarized illumination light into first and second polarized light beams having respective polarized light components orthogonal to each other, a mirror for reflecting one of the polarized light beams separated by the beam splitter, and a phase plate for causing one of the polarized light beams to have a polarization in the same direction as that of the other. Thus, the polarization converting device 6 converts nonpolarized illumination light into light having only one of polarized light components and emits the resulting light.

The polarization converting device 6 is disposed immediately downstream the exit of the flyeye 17 on the FLC device side. This position is near the position where a plurality of secondary light source images corresponding to the number of divisions of the flyeye 16 are generated, whereas the phase plate of the polarization converting device 6 corresponds to each of them. Since the secondary light source images are formed as being divided into partial luminous fluxes by the cells of the flyeye 16 on the light source section side, each secondary light source has a large F value (i.e., the angular distribution of luminous fluxes is narrow). Since the flyeye integrator 5 and the polarization converting device 6 are arranged as such, the illumination light can efficiently be converted into light having only one polarized light component. This example is configured such that all the luminous fluxes emitted from the polarization converting device 6 become S-polarized light with respect to a polarization separating film 21 downstream thereof.

The partial luminous fluxes emitted from the polarization converting device 6 are converged by condenser lenses 18, 20 so as to be superposed on each other in the area to be illuminated, and are made incident on the PBS 2. A bending mirror 19 is inserted in an optical path from the polarization converting device 6 to the PBS 2, so as to deflect the optical path.

The illumination light is reflected by the polarization separating film 21 within the PBS 2 so as to bend by about 90 degrees, thereby reaching the reflection type liquid crystal display device 3. As explained above, all the luminous fluxes emitted from the polarization converting device 6 are S-polarized light with respect to the polarization separating film 21. Therefore, all of them are reflected by the polarization separating film 21. In this example, the reflection type liquid crystal display device 3 is an FLC device. The S-polarized illumination light having reached the FLC device 3 is optically modulated pixel by pixel, and then reenters the PBS 2. The luminous flux (modulated into P-polarized light) to be projected is transmitted through the polarization separating film 21, whereas the luminous flux (still in S-polarized light) to be blocked is returned toward the illumination optical system.

In this example, as mentioned above, a plane including the optical axis of illumination light incident on the PBS 2 and the optical axis of illumination light emitted from the PBS 2 toward the projection lens is substantially parallel to the direction in which a shorter side of the reflection type liquid crystal display device 3 extends, whereby the optical path by which the illumination light passes through the PBS 2 can be shortened.

Preferably, in this example, the front-group lens 13 of the afocal unit 4 is made detachable. In such an apparatus, there is a case where the reflector 12 is replaced with others so as to attain a greater or smaller aperture diameter. When the front-group lens 13 of the afocal unit 4 is made detachable in this case, the apparatus can conform to reflectors having different sizes by changing the front-group lens 13 of the afocal unit 4 alone without altering the optical system downstream the flyeye integrator 5 at all.

Figure 3B:
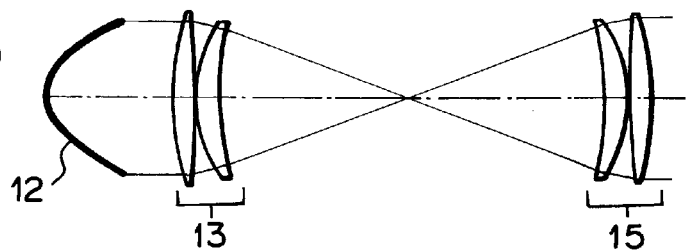
Figure 3C:
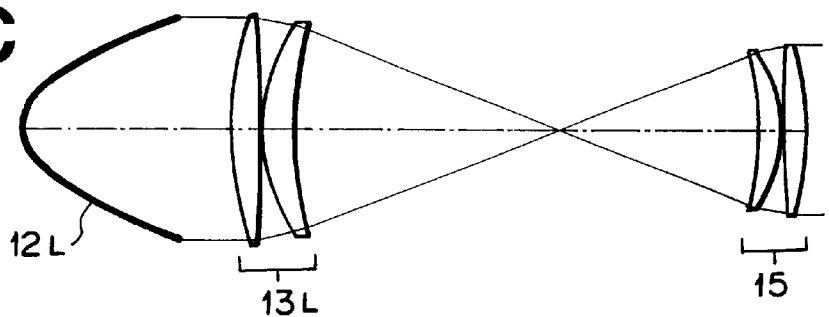

FIGS. 3A to 3C are views showing relationships between reflectors having different sizes and the front- and rear-group lenses 13, 15 (hereinafter referred to as "afocal system") of the afocal unit 4. While the power of afocal system is defined by angular magnification $\gamma=-$(front-group focal length)/(rear-group focal length), FIGS. 3A to 3C correspond to cases where $\gamma=-0.8$, $-1.0$, and $-1.4$, respectively. The example shown in FIG. 1 is the state of FIG. 3B.

As shown in FIGS. 3A to 3C, a system is set such that the value of angular magnification $\gamma$ in the afocal system is smaller when the aperture diameter is smaller as in the reflector $12_S$ (FIG. 3A), and greater when the aperture diameter is larger as in the reflector $12_L$ (FIG. 3C), whereby the luminous flux diameter becomes constant at a position where it is emitted from the rear-group lens 15 of the afocal unit 4. When the front-group lenses $13_S$, 13, $13_L$ are exchanged in conformity to the diameter of beam emitted from the reflectors $12_S$, 12, $12_L$, the illumination light from the reflectors $12_S$, 12, $12_L$ can efficiently be utilized. Also, by simply exchanging the front-group lenses $13_S$, 13, $13_L$, the illumination optical system can be constructed as it is without altering the rear-group lens 15 of the afocal unit 4 and its downstream. Thus, it is highly convenient.

Example 2

FIGS. 4A to 4C shows the configuration of a projection type image display apparatus using a reflection type liquid crystal display device in accordance with Example 2. FIG. 4A shows the optical arrangement of the apparatus of Example 2 as seen from the front face thereof. FIG. 4B shows the optical arrangement of the apparatus as seen from the top. FIG. 4C shows the optical arrangement of a part of the apparatus as seen from the right side of the paper surface of FIG. 4A. While this apparatus has a configuration substantially the same as that of the apparatus of Example 1 and yields operations and effects substantially the same as those of Example 1, it differs therefrom in that a mirror 23 is inserted, which will now be explained.

In general, reflection characteristics of S-polarized light and P-polarized light with respect to a mirror are such that, as mentioned above concerning the polarization separating film 21, better characteristics are obtained by S-polarized light than P-polarized light with respect to the mirror surface. Therefore, from the viewpoint of light quantity loss caused by reflection on the mirror, an optical arrangement in which S-polarized light rather than P-polarized light is incident on the mirror surface is desirable. Here, since the bending mirror 19 is arranged in an orientation rotated by 90 degrees with respect to the polarization separating film 21, the apparatus of Example 1 has such a configuration that luminous fluxes of P-polarized light are reflected with respect to the bending mirror surface.

This example is configured such that, after the direction of polarization is unified by the polarization converting device 6, both the polarization separating film 21 and bending mirror 19 reflect the S-polarized light component, whereby light quantity loss can be prevented from occurring. For attaining such a configuration, the mirror 23 is inserted between the two flyeyes 16, 17 of the flyeye integrator 5, whereby the bending mirror 19 and the polarization separating film 21 are arranged substantially parallel to each other.

Preferably, the front-group lens 13 of the afocal unit 4 is made detachable so as to be replaced with others in conformity to changes in aperture diameter of the reflector 12 in this example as well.

Example 3

Figure 5:
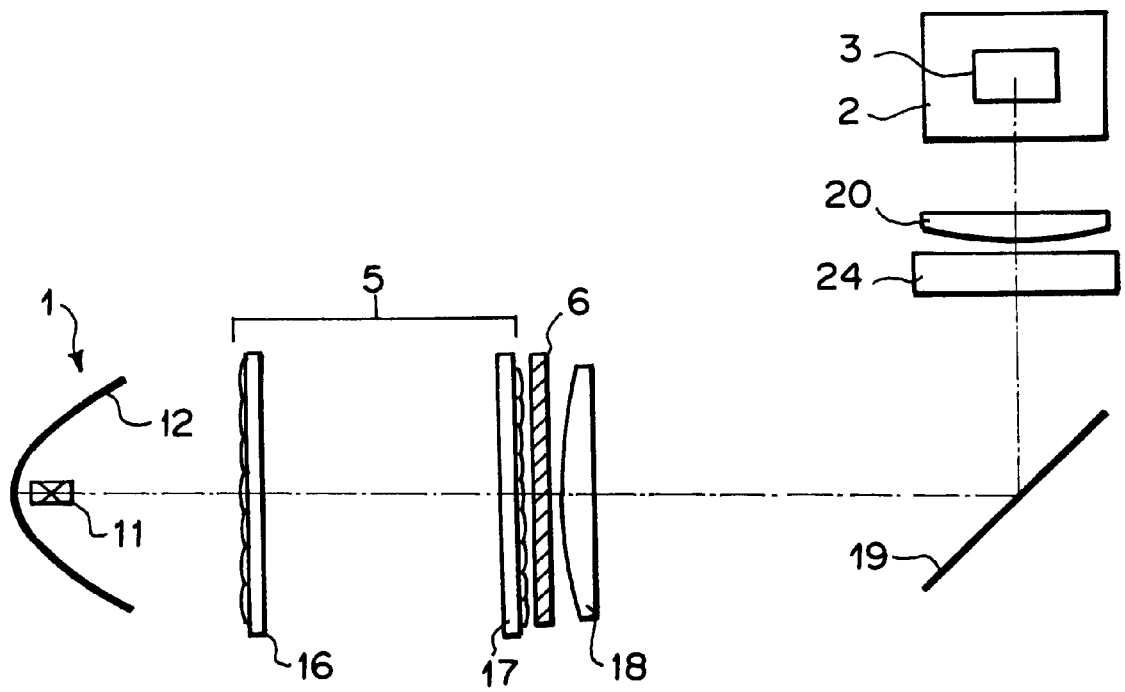
FIG. 5 is a view showing the optical arrangement of a projection type image display apparatus using a reflection type liquid crystal display device in accordance with Example 3.

FIG. 5 is a view showing a projection type image display apparatus using a reflection type liquid crystal display device of Example 3 as seen from the front face thereof. In this example, without repeating the configuration, operations, and effects substantially the same as those of the apparatus of Example 1, only differences therefrom will be explained.

In this example, the afocal unit 4 including the color wheel 14 is removed from Example 1, whereas a color switching device 24 is disposed as a color decomposing means between the polarization converting device 6 and the PBS 2. Here, the color switching device 24 is an optical device in which several layers of liquid crystal are stacked together, and acts to make its transmitting or reflecting wavelength region variable depending on the voltage applied thereto. Using such a device can decompose incident white light into a plurality of color light components in a time series, thus being able to act as a color decomposing means. For example, ColorSwitch (registered trademark) made by ColorLink, Inc. is a color switching device 24 which can isolate six light beams in combinations of two polarization directions orthogonal to each other and three primary light components while arbitrarily setting colors and polarization directions.

When the color switching device 24 is used as such, it is not necessary to arrange the afocal unit 4 as in the case using the color wheel 14, while the light source section 1 can be disposed closer to the flyeye integrator 5 to a certain extent, whereby the apparatus can be made smaller. Since the device 24 is made of a liquid crystal, it is preferred that the color switching device 24 be positioned where the illumination light having a unified polarization direction is incident.

This example may also be configured such that, for example as with Example 1, the whole afocal unit 4 is detachable in the apparatus in which the afocal unit 4 is inserted, whereby the afocal unit 4 including the color wheel 14 is inserted or replaced with the color switching device 24 when necessary. When changing color decomposing means as such, it is not necessary to alter other optical components, whereby the changes can be made easily.

Without being restricted to the above-mentioned examples, the projection type image display apparatus using a reflection type liquid crystal display device of the present invention can be modified in various manners.

For example, the reflector of the light source section may be an ellipsoidal mirror. When an ellipsoidal mirror is employed as a reflector in an apparatus having a configuration in which an afocal unit equipped with a color wheel is arranged, e.g., in the apparatus of Example 1, an effect equivalent to that of a parabolic mirror can be obtained by the light-collecting action of the ellipsoidal reflector if a luminous body is disposed near a first focal point of the ellipsoidal mirror while removing the front-group lens of the afocal unit, and the reflector is arranged such that the color wheel is positioned near a second focal point of the ellipsoidal mirror. When the ellipsoidal mirror is used as the reflector, the front-group lens of the afocal unit becomes unnecessary, whereby a lower cost and a smaller size can be attained. Also, in the apparatus having a configuration similar to that of Example 1, the front-group lens of the afocal unit can be made detachable, so as to be attached/detached as the reflector is altered.

The color decomposing means is not limited to those of the above-mentioned examples. For example, a reflection type color wheel may be used.

The integrator section is not limited to the flyeye integrator, but may be constituted by a rod integrator, for example. When the rod integrator is used, the incident light is not required to be substantially parallel light as in the flyeye integrator. Also, since the luminous flux emitted from the rod integrator attains a state different from that emitted from the flyeye integrator, it is preferred that members, such as a polarization converting device and lenses, suitable for the rod integrator be provided.

When the flyeye integrator is employed, at least one flyeye may be configured such that a plurality of eccentric lenses are arranged two-dimensionally. The flyeye cells are made radially eccentric with respect to the optical axis in general, whereby the illumination efficiency can be improved by use of eccentric lenses.

The apparatus of the present invention may be configured such that at least one optical component having an aspheric surface is disposed in an optical path from the light source section to the reflection type liquid crystal display device.

While an FLC device advantageous in its high response speed to applied voltages is used as a reflection type liquid crystal display device in the above-mentioned examples, the reflection type liquid crystal display device in the apparatus of the present invention is not restricted thereto. Though the above-mentioned examples relate to color image display apparatus for carrying out color decomposing processing, the present invention is also applicable to projection type image display apparatus carrying out no color decomposing processing as a matter of course.

As explained in the foregoing, the projection type image display apparatus using a reflection type liquid crystal display device of the present invention is configured such that a plane including the optical axis of illumination light incident on the PBS and the optical axis of illumination light projected from the PBS toward the projection lens is substantially parallel to the direction in which a shorter side of a rectangular reflection type liquid crystal display device extends, so as to shorten the optical path within the PBS in a process during which the luminous flux reflected by the reflection type liquid crystal display device is emitted toward the screen by way of the PBS, whereby projected images can attain a higher contrast, whereas the apparatus can be made smaller at a lower cost. The projection type image display apparatus using a reflection type liquid crystal display device of the present invention may be configured such that an FLC device is used as the reflection type liquid crystal display device while a single-plate type color decomposing means is provided. An apparatus having a high contrast at a low cost can be obtained in this case as well.

What is claimed is:

1. A projection type image display apparatus which makes illumination light from a light source section incident on a rectangular reflection type liquid crystal display device by way of a polarization beam splitter, optically modulates said illumination light in said reflection type liquid crystal display device, and projects thus modulated light through a projection lens by way of said polarization beam splitter;

wherein a plane including an optical axis of said illumination light incident on said polarization beam splitter and an optical axis of said illumination light emitted from said polarization beam splitter toward said projection lens is substantially parallel to a direction in which a shorter side of said reflection type liquid crystal display device extends.

2. A projection type image display apparatus according to claim 1, wherein said illumination light incident on said polarization beam splitter is bent by about 90 degrees by a polarization separating film within said polarization beam splitter so as to be reflected toward said reflection type liquid crystal display device, reflected by said reflection type liquid crystal display device, and then transmitted through said polarization separating film of said polarization beam splitter so as to be emitted toward said projection lens.

3. A projection type image display apparatus according to claim 1, wherein said illumination light incident on said polarization beam splitter is transmitted through a polarization separating film within said polarization beam splitter so as to be emitted toward said reflection type liquid crystal display device, reflected by said reflection type liquid crystal display device, and then bent by about 90 degrees by said polarization separating film of said polarization beam splitter so as to be reflected toward said projection lens.

4. A projection type image display apparatus according to claim 1, further comprising color decomposing means for decomposing said illumination light from said light source section into a plurality of color light components.

5. A projection type image display apparatus according to claim 1, wherein said light source section outputs nonpolarized illumination light, said illumination light being made incident on said polarization beam splitter by way of an integrator section for homogenizing an intensity distribution of said illumination light within a cross section perpendicular to an optical axis thereof and polarization converting means for converting said illumination light into linearly polarized light vibrating in one direction.

6. A projection type image display apparatus according to claim 5, wherein said integrator section comprises a rod integrator.

7. A projection type image display apparatus according to claim 5, wherein said integrator section comprises a flyeye integrator composed of at least two flyeyes, each constituted by a plurality of lenses arranged two-dimensionally, disposed on an optical axis; and wherein a polarization converting device is disposed as said polarization converting means downstream said integrator section, said polarization converting device comprising a beam splitter for splitting said incident nonpolarized illumination light into first and second polarized light beams having respective polarized light components orthogonal to each other, a mirror for reflecting one of said polarized light beams separated by said beam splitter, and a phase plate for turning one of said polarized light beams into a light beam having the same direction of polarization as that of the other polarized light beam, so that said nonpolarized illumination light is emitted after being converted into light having only one of said polarized light components.

8. A projection type image display apparatus according to claim 4, wherein said color decomposing means is a color wheel apparatus or color switching device.

9. A projection type image display apparatus according to claim 7, wherein said light source section outputs substantially parallel illumination light; and wherein said illumination light is made incident on said integrator section by way of an afocal unit comprising front- and rear-group lenses constituting a substantially afocal system and a transmission type color wheel disposed as said color decomposing means near a focal point of said afocal system.

10. A projection type image display apparatus according to claim 9, wherein said front- and rear-group lenses of said afocal unit are constituted by components identical to each other.

11. A projection type image display apparatus according to claim 9, wherein said front-group lens of said afocal unit or said afocal unit as a whole is made detachable.

12. A projection type image display apparatus according to claim 1, wherein said reflection type liquid crystal display device is a ferroelectric liquid crystal display device.

13. A projection type image display apparatus according to claim 1, wherein said illumination light is made incident on said polarization separating film of said polarization beam splitter as S-polarized light and then bent by about 90 degrees by said polarization separating film so as to be reflected toward said reflection type liquid crystal display device, or is made incident on said polarization separating film of said polarization beam splitter as P-polarized light and then transmitted through said polarization separating film so as to be emitted toward said reflection type liquid crystal display device.

14. A projection type image display apparatus according to claim 1, wherein at least one optical component disposed in an optical path from said light source section to said reflection type liquid crystal display device has an aspheric form.

* * * * *